(12) United States Patent
Sharp

(10) Patent No.: US 9,177,416 B2
(45) Date of Patent: Nov. 3, 2015

(54) SPACE SKIPPING FOR MULTI-DIMENSIONAL IMAGE RENDERING

(75) Inventor: Toby Sharp, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 900 days.

(21) Appl. No.: 12/728,921

(22) Filed: Mar. 22, 2010

(65) Prior Publication Data
US 2011/0228055 A1 Sep. 22, 2011

(51) Int. Cl.
*G06T 15/08* (2011.01)
*G06T 15/00* (2011.01)
*G06T 15/06* (2011.01)
*H04N 13/02* (2006.01)

(52) U.S. Cl.
CPC ............. *G06T 15/06* (2013.01); *G06T 15/08* (2013.01); *H04N 13/0275* (2013.01)

(58) Field of Classification Search
CPC ................................ G06T 15/08; G06T 15/06
See application file for complete search history.

(56) References Cited

U.S. PATENT DOCUMENTS

| | | | |
|---|---|---|---|
| 6,166,742 A | 12/2000 | He | |
| 7,242,401 B2 | 7/2007 | Yang et al. | |
| 2006/0147106 A1* | 7/2006 | Yang et al. | 382/154 |
| 2007/0064002 A1 | 3/2007 | Xue et al. | |
| 2007/0165026 A1 | 7/2007 | Engel | |
| 2008/0231632 A1* | 9/2008 | Sulatycke | 345/424 |
| 2009/0102842 A1* | 4/2009 | Li | 345/422 |
| 2009/0284537 A1* | 11/2009 | Hong et al. | 345/522 |

OTHER PUBLICATIONS

Zhou et al , "Real-Time KD-Tree Construction on Graphics Hardware". ACM Trans. Graph. 27, 5, Article 126 (Dec. 2008), 11 pages.*
Engel, Hastreiter, Tomandl, Eberhardt, Ertl, "Combining Local and Remote Visualization Techniques for Interactive Volume Rendering in Medical Applications", retrieved on Jan. 15, 2010 at <<http://ieeexplore.ieee.org/stamp/stamp.jsp?arnumber=00885729>>, IEEE Computer Society Press, Conference on Visualization, 2000, pp. 449-452.

(Continued)

*Primary Examiner* — Tize Ma
(74) *Attorney, Agent, or Firm* — Steve Wight; Judy Yee; Micky Minhas

(57) ABSTRACT

Space skipping for multi-dimensional image rendering is described. In an embodiment a ray-casting engine is used to form a two dimensional image from an at least three dimensional image volume by computing rays extending from a camera location, through the two dimensional image and into the volume. For example, a space skipping logic is used to clip the rays such that computationally expensive aspects of ray-casting only need to be performed along the clipped rays. For example a volume pyramid is formed by repeatedly reducing the resolution of the volume data. In an example, each ray is intersected with the lowest resolution volume of the pyramid and clipped using data from that volume. In examples, the clipping is then repeated at higher resolutions in order to clip the ray closely to non-transparent voxels in the volume and optimize the task of rendering the image.

20 Claims, 9 Drawing Sheets

(56) References Cited

OTHER PUBLICATIONS

Engel, Kraus, Ertl, "High-Quality Pre-Integrated Volume Rendering Using Hardware-Accelerated Pixel Shading", retrieved on Jan. 15, 2010 at <<http://delivery.acm.org/10.1145/390000/383515/p9-engel.pdf?key1=383515&key2=3335553621&coll=GUIDE&dl=GUIDE&CFID=72997113&CFTOKEN=95673515>>, ACM, Conference on Graphics Hardware, 2001, pp. 9-16.

Engel, Hadwiger, Kniss, Lefohn, Salama, Weiskopf, "Real-Time Volume Graphics", retrieved on Jan. 15, 2010 at <<http://delivery.acm.org/10.1145/1110000/1103929/cs28.pdf?key1=1103929&key2=2381653621&coll=GUIDE&dl=GUIDE&CFID=71351530&CFTOKEN=13988399>> ACM Conference on Computer Graphics and Interactive Techniques (SIGGRAPH), Course Notes 28, 2004, pp. 1-166.

"fovia.com", retrieved on Jan. 15, 2010 at <<http://www.fovia.com/>>, Fovia, 2005, pp. 1.

Guthe, Wand, Gonser, Straber, "Interactive Rendering of Large Volume Data Sets", retrieved on Jan. 15, 2010 at <<http://www.mpi-inf.mpg.de/~mwand/papers/vis02.pdf>>, IEEE Computer Society, Conference on Visualization, 2002, pp. 53-60.

Hardenbergh, Buchbinder, Thurston, Lombardi, Harris, "Integrated 3D Visualization of fMRI and DTI tractography", retrieved on Jan. 15, 2010 at <<http://www.jch.com/volumes/dtifmri.htm>>, IEEE Visualization, Oct. 2005, pp. 94-96.

Hastreiter, Rezk-Salalma, Tomandl, Eberhardt, Ertl, "Interactive Direct Volume Rendering of the Inner Ear for the Planning of Neurosurgery", retrieved on Jan. 15, 2010 at <<http://www.vis.uni-stuttgart.de/ger/research/pub/pub1999/BVM99.pdf>>, 1999, pp. 192-196.

Humphreys, Houston, Ng, Frank, Ahern, Kirchner, Klosowski, "Chromium: A Stream-Processing Framework for Interactive Rendering on Clusters", retrieved on Jan. 15, 2010 at <<http://www-graphics.stanford.edu/papers/cr/cr_lowquality.pdf>>, ACM Transactions on Graphics, vol. 21, No. 3, 2002, pp. 693-702.

Kainz, Grabner, Bornik, Hauswiesner, Muehl, Schmalstieg, "Ray Casting of Multiple Volumetric Datasets with Polyhedral Boundaries on Manycore GPUs", retrieved on Jan. 15, 2010 at <<http://delivery.acm.org/10.1145/1620000/1618498/a152-kainz.pdf?key1=1618498&key2=4076553621&coll=ACM&dl=ACM&CFID=15151515&CFTOKEN=6184618>>, ACM Transactions on Graphics, vol. 28, No. 5, Article 152, Dec. 2009, pp. 1-9.

Kniss, Kindlmann, Hansen, "Multi-Dimensional Transfer Functions for Interactive Volume Rendering", retrieved on Jan. 15, 2010 at <<http://www.cs.utah.edu/~jmk/kniss_tvcg02-small.pdf>>, IEEE Educational Activities Department, Transactions on Visualization and Computer Graphics, vol. 8, No. 3, 2002, pp. 270-285.

Kruger, Westermann, "Acceleration Techniques for GPU-based Volume Rendering", retrieved on Jan. 15, 2010 at <<http://delivery.acm.org/10.1145/1090000/1081482/20300038.pdf?key1=1081482&key2=4527553621&coll=GUIDE&dl=GUIDE&CFID=73001878&CFTOKEN=97173740>>, IEEE Computer Society, Visualization Conference, Oct. 19, 2003, pp. 287-292.

Lacroute, Levoy, "Fast Volume Rendering Using a Shear-Warp Factorization of the Viewing Transformation", retrieved on Jan. 15, 2010 at <<http://www.cs.virginia.edu/~gfx/Courses/2002/BigData/papers/Volume%20Rendering/Fast%20Volumce%20Rendering%-20Using%20a%20Shear-Warp%20Factorization%20of%20-the%20Viewing%20Transformation.pdf>>, ACM, Conference on Computer Graphics and Interactive Techniques, 1994, pp. 451-458.

Lacroute, "Real-Time Volume Rendering on Shared Memory Multi-processors Using the Shear-Warp Factorization", retrieved on Jan. 15, 2010 at <<http://delivery.acm.org/10.1145/220000/218331/p15-lacroute.pdf?key1=218331&key2=1757553621&coll=GUIDE&dl=GUIDE&CFID=73002777&CFTOKEN=99713525>>, ACM, Parallel Rendering Symposium, 1995, pp. 15-22.

Levoy, "Display of Surfaces from Volume Data", retrieved on Jan. 15, 2010 at <<http://www-graphics.stanford.edu/papers/valume-cga88/volume.pdf>>, IEEE Computer Society Press, Computer Graphics and Applications, vol. 8, No. 3, 1988, pp. 29-37.

Levoy, "Volume Rendering by Adaptive Refinement", retrieved on Jan. 15, 2010 at <<http://citeseer.ist.psu.edu/cache/papers/cs/3765/http:zSzzSzwww.cse.fsu.eduzsz%7EerlebachzSzcourseszSzscivizzSzpaperszSzvolumetric_paperszSzPAPERSzSzLEVOYzSzLEV90CzLEVOY90C.pdf/levoy89volume.pdf>>, Springer-Verlag New York, The Visual Computer: International Journal of Computer Graphics, vol. 6, No. 1, 1990, pp. 2-7.

Li, Mueller, Kaufman, "Empty Space Skipping and Occlusion Clipping for Texture-based Volume Rendering", retrieved on Jan. 15, 2010 at <<http://www.google.co.uk/url?sa=t&source=web&ct=res&cd=3&ved=0CBAQFjAC&url=http%3A%2F%2Fciteseerx.ist.psu.edu%2Fviewdoc%2Fdownload%3Fdoi%3D10.1.1.75.7206%26rep%3Drep1%26type%3Dpdf&rct=j&q=%22Empty+space+skipping+and+occlusion+clipping+for+texture-based+volume+rendering%22&ei=xlBQS8PFH6f60wTyx8GzDQ&usg=AFQjCNFhikSm_SXZXTafl_9UJwiEu62Hw>>, IEEE Computer Society, In Proc. IEEE Visualization 2003.

Ljung, "Efficient Methods for Direct Volume Rendering of Large Data Sets", Linkoping University, Sweden, Doctoral Thesis, 2006, pp. 1-77.

Lum, Ma, Clyne, "Texture Hardware Assisted Rendering of Time-Varying Volume Data", retrieved on Jan. 15, 2010 at <<http://www.google.co.uk/url?sa=t&source=web&ct=res&cd=3&ved=0CBQQFjAC&url=http%3A%2F%2Fciteseerx.ist.psu.edu%2Fviewdoc%2Fdownload%3Fdoi%3Drep1%26type%3Drpdf&rct=j&q=%22Texture+hardware+assisted+rendering+of+time-varying+volume+data%22&ei=LFBQS7L6NYKM0gSdoeyvCg&usg=AFQjCNEb8jCRrqn9d2GmHGSxX3SqD0Txow>>, IEEE Computer Visualization Conf., pp. 263-270, 2001.

Lux, Frohlick, "GPU-based Ray Casting of Multi-Resolution Volume Datasets", retrieved on Jan. 19, 2010 at <<http://www.uni-weimar.de/cms/fileadmin/medien/vr/documents/publications/ISVC2009_ray_casting_multiple_multi_resolution_volume_data_sets_final.pdf>>, Springer-Verlag, Berlin, Symposium on Advances in Visual Computing, Lecture Notes In Computer Science, vol. 5876, 2009, pp. 104-116.

Lux, Frohlich, "Ray Casting of Large Multi-Resolution Volume Datasets", retrieved on Jan. 19, 2010 at <<http://meetingorganizer.copernicus.org/EGU2009-3951-4.pdf>>, EGU General Assembly, Geophysical Research Abstracts, vol. 11, 2009, pp. 1.

Ma, Painter, Hansen, Krogh, "A Data Distributed, Parallel Algorithm for Ray-Traced Volume Rendering", retrieved on Jan. 15, 2010 at <<http://delivery.acm.org/10.1145/170000/166183/p15-ma.pdf?key1=166183&key2=5288553621&coll=GUIDE&dl=GUIDE&CFID=71345538&CFTOKEN=62659826>>, ACM, Symposium on Parallel Rendering, 1993, pp. 15-22 and 105.

Neumann, "Interactive Volume Rendering on a Multicomputer", retrieved on Jan. 15, 2010 at <<http://delivery.acm.org/10.1145/150000/147170/p87-neumann.pdf?key1=147170&key2=3598553621&coll=GUIDE&dl=GUIDE&CFID=71345781&CFTOKEN=32476404>>, ACM, Symposium on Interactive 3D Graphics, 1992, pp. 87-93.

Patidar, Narayanan, "Ray Casting Deformable Models on the GPU", retrieved on Jan. 15, 2010 at <<http://cvit.iiit.ac.in/projects/gpuproject/rccudazone.pdf>>, IEEE Computer Society, Conference on Computer Vision, Graphics & Image Processing (ICVGIP), 2008, pp. 481-488.

Persson, Dahlstrom, Smedby, Brismar, "Volume rendering of three-dimensional drip infusion CT cholangiography in patients with suspected obstructive biliary disease: a retrospective study", The British Journal of Radiology, vol. 78, Dec. 2005, pp. 1078-1085.

Raspe, Muller, "Controlling GPU-based Volume Rendering using Ray Textures", retrieved on Jan. 19, 2010 at <<http://www.uni-koblenz.de/~cg/Veroeffentlichungen/Raspe_WSCG08_preprint.pdf>>, Union Agency, Science Press, WSCG, Feb. 4, 2008, pp. 1-7.

Rautek, Bruckner, Grolier, "Semantic Layers for Illustrative Volume Rendering", retrieved on Jan. 15, 2010 at <<http://ieeexplore.ieee.org/stamp/stamp.jsp?tp=&arnumber=4376159&isnumber=4376125>>, IEEE Transactions on Visualization and Computer Graphics, vol. 13, No. 6, Nov. 2007, pp. 1336-1343.

Rezk-Salama, Engel, Bauer, Greiner, Ertl, "Interactive Volume Rendering on Standard PC Graphics Hardware Using Multi-Textures and

(56) References Cited

OTHER PUBLICATIONS

Multi-Stage Rasterization", retrieved on Jan. 15, 2010 at <<http://delivery.acm.org/10.1145/350000/348238/p109-rezk-salama.pdf?key1=348238&key2=3298553621&coll=GUIDE&dl=GUIDE&CFID=73006064&CFTOKEN=38097735>>, ACM, Conference on Graphics Hardware, 2000, pp. 109-118.

Robler, Botchen, Ertl, "Dynamic Shader Generation for Flexible Multi-Volume Visualization", retrieved on Jan. 15, 2010 at <<http://www.vis.uni-stuttgart.de/ger/research/pub/pub2008/pacificvis08-roessler.pdf>>, IEEE, Pacific Visualization Symposium (PacificVis), 2008, pp. 17-24.

Robler, Tejada, Fangmeier, Ertl, Knauff, "GPU-based Multi-Volume Rendering for the Visualization of Functional Brain Images", retrieved on Jan. 15, 2010 at <<http://www.vis.uni-stuttgart.de/ger/research/pub/pub2006/simvis06-roessler.pdf>>, Proceedings of SimVis, 2006, pp. 305-318.

Sato, Westin, Bhalerao, Nakajima, Shiraga, Tamura, Kikinis, "Tissue Classification Based on 3D Local Intensity Structures for Volume Rendering", retrieved on Jan. 15, 2010 at <<http://ieeexplore.ieee.org/stamp/stamp.jsp?tp=&arnumber=856997&isnumber=18616>>, IEEE Transactions on Visualization and Computer Graphics, vol. 6, No. 2, Apr. 2000, pp. 160-180.

Silva, Comba, Callahan, Bernardon, "A Survey of GPU-Based Volume Rendering of Unstructured Grids", retrieved on Jan. 15, 2010 at <<http://www.sci.utah.edu/~csilva/papers/rita2005.pdf>>, Revista de Informatica Teorica e Aplicada (RITA), vol. 12, No. 2, 2005, pp. 9-29.

Singh, Gupta, Levoy, "Parallel Visualization Algorithms: Performance and Architectural Implications", retrieved on Jan. 15, 2010 at <<http://ieeexplore.ieee.org/stamp/stamp.jsp?arnumber=00299410>>, IEEE Computer Society Press, Computer, vol. 27, No. 7, Jul. 1994, pp. 45-55.

Smelyanskiy, Holmes, Chhugani, Larson, Carmean, Hanson, Dubey, Augustine, Kim, Kyker, Lee, Nguyen, Seiler, Robb, "Mapping High-Fidelity Volume Rendering for Medical Imaging to CPU, GPU and Many-Core Architectures", retrieved on Jan. 15, 2010 at <<http://techresearch.intel.com/UserFiles/en-us/File/terascale/Mayo_IEEE_VIS2009_FINAL.PDF>>, IEEE Transactions on Visualization and Computer Graphics, vol. 15, No. 6, Nov. 2009, pp. 1563-1570.

Beyer, "GPU-based Multi-Volume Rendering of Complex Data in Neuroscience and Neurosurgery", retrieved on Jan. 15, 2010 at <<http://www.cg.tuwien.ac.at/research/publications/2009/beyer-2009-gpu/beyer-2009-gpu-paper.pdg>>, Vienna University of Technology, Doctoral Dissertation, Oct. 2009, pp. 1-117.

Borland, Clarke, Fielding, Taylor, "Volumetric depth peeling for medical image display", retrieved on Jan. 15, 2010 at <<http://www.google.co.uk/url?sa=t&source=web&ct=res&cd=3&ved=0CBIQFjAC&url=http%3A%2F%2Fciteseerx.ist.psu.edu%2Fviewdoc%2Fdownload%3Fdoi%3D10.1.1.99.6480%26rep%3Drep1%26type%3Dpdf&rct=j&q=%22Volumetric+depth+peeling+for+medical+image+display%22&ei=wkBQS_O0KJ360wTZzMWzDQ&usg=AFQjCNFDTfv3fZAsr_o9l-tlsrdu8TuhHQ>>, Visualization and data analysis 2006, (Jan. 16, 2006).

Bruckner, Groller, "Exploded Views for Volume Data", retrieved on Jan. 15, 2010 at <<http://ieeexplore.ieee.org/stamp/stamp.jsp?tp=&arnumber=4015467&isnumber=4015412>>, IEEE Transactions on Visualization and Computer Graphics, vol. 12, No. 5, 2006, pp. 1077-1084.

Bullitt, Aylward, "Volume Rendering of Segmented Tubular Objects", Medical Image Computing and Computer-Assisted Intervention (MICCAI), 2001, pp. 161-198.

Criminisi, Shotton, Bucciarelli, Siggiqui, "Automatic Semantic Parsing of CT Scans via Multiple Randomized Decision Trees", Radiological Society of North America (RSNA), PowerPoint presentation, Dec. 2009, pp. 1-13.

Criminisi, Shotton, Bucciarelli, Siggiqui, "Automatic Semantic Parsing of CT Scans via Multiple Randomized Decision Trees", Radiological Society of North America (RSNA), Abstract, Dec. 2009, pp. 1-2.

Criminisi, Shotton, Bucciarelli, "Decision Forests with Long-Range Spatial Context for Organ Localization in CT Volumes", retrieved on Jan. 15, 2010 at <<http://research.microsoft.com/pubs/81675/Criminisi_MICCAI_PMMIA_2009_.pdf>>, Workshop on Probabilistic Models for Medical Image Analysis (MICCAI), 2009, pp. 1-12.

Criminisi, Sharp, Blake, "GeoS: Geodesic Image Segmentation", retrieved on Jan. 15, 2010 at <<http://research.microsoft.com/pubs/71446/Criminisi_eccv2008.pdf>>, Springer-Verlag Berlin, European Conference on Computer Vision (ECCV), Part 1, vol. 5302, 2008, pp. 99-112.

Eide, "Near-Neighbor Approach to GPU-based Volume Rendering", retrieved on Jan. 19, 2010 at <<http://home.dataparty.no/kristian/school/ntnu/masterthesis/near-neighbor-paper.pdf>>, Norwegian University of Science and Technology, Master Thesis, Sep. 2004, pp. 1-7.

Engel, Sommer, Ertl, "A Framework for Interactive Hardware Accelerated Remote 3D-Visualization", Proceedings of EG/IEEE TCVG Symposium on Visualization (VisSympp), May 2000, pp. 167-177 and 291.

Strengert, Magallon, Weiskopf, Guthe, Ertl, "Large Volume Visualization of Compressed Time-Dependent Datasets on GPU Clusters", retrieved on Jan. 15, 2010 at <<http://www.vis.uni-stuttgart.de/ger/research/pub/pub2005/pc05-strengert.pdf>>, Elsevier Science Publishers, Amsterdam, Parallel Computing, vol. 31, No. 2, Feb. 2005, pp. 205-219.

Tam, Healey, Flak, Cahoon, "Volume Rendering of Abdominal Aortic Aneurysms", retrieved on Jan. 15, 2010 at <<http://ieeexplore.ieee.org/stamp/stamp.jsp?arnumber=00663855>>, IEEE Computer Society Press, Conference on Visualization, 1997, pp. 43-52.

Tatarchuk, Shopf, DeCorob, "Advanced interactive medical visualization on the GPU", retrieved on Jan. 15, 2010 at <<http://www.cs.princeton.edu/gfx/pubs/Tatarchuk_2008_AIM/Tatarchuk2008.pdf>>, Elsevier Publishing, Journal of Parallel and Distributed Computing, vol. 68, 2008, pp. 1319-1328.

"thevisualMD", retrieved on Jan. 15, 2010 at <<http://www.thevisualmd.com/>>, pp. 1.

Tomandl, Hastreiter, Rezk-Salama, Engel, Ertl, Huk, Naraghi, Ganslandt, Nimsky, Eberhardt, "Local and Remote Visualization Techniques for Interactive Direct Volume Rendering in Neuroradiology", retrieved on Jan. 15, 2010 at <<http://radiographics.rsna.org/content/21/6/1561.full>>, RSNA, RadioGraphics, vol. 21, No. 6, Nov. 2001, pp. 1561-1572.

Totsuka, Levoy, "Frequency Domain Volume Rendering", retrieved on Jan. 15, 2010 at <<http://www-graphics.stanford.edu/papers/fvr/totsuka-fvr-sig93.pdf>>, ACM, Conference on Computer Graphics and Interactive Techniques, 1993, pp. 271-278.

Viola, Kanitsar, Grolier, "GPU-based Frequency Domain Volume Rendering", retrieved on Jan. 15, 2010 at <<http://citeseerx.ist.psu.edu/viewdoc/download?doi=10.1.1.3.6848&rep=rep1&type=pdf>>, ACM, Conference on Computer Graphics, 2004, pp. 55-64.

Waage, "State of the Art Parallel Computing in Visualization using CUDA and OpenCL", retrieved on Jan. 15, 2010 at <<http://www.ii.uib.no/vis/teaching/vis-seminar/2009-fall/waage/waage_star.pdf>>, The Eurographics Association, Seminar in Visualization, 2008, pp. 1-7.

Wald, Friedrich, Marmitt, Slusallek, Seidel, "Faster Isosurface Ray Tracing Using Implicit KD-Trees", retrieved on Jan. 15, 2010 at <<http://ieeexplore.ieee.org/stamp/stamp.jsp?arnumber=01471693>>, IEEE Transactions on Visualization and Computer Graphics, vol. 11, No. 5, Sep. 2005, pp. 562-572.

Westermann, Ertl, "Efficiently Using Graphics Hardware in Volume Rendering Applications", retrieved on Jan. 15, 2010 at <<http://www.vis.uni-stuttgart.de/ger/research/pub/pub1998/SIGGRAPH98.pdf>>, ACM, Conference on Computer Graphics and Interactive Techniques, 1998, pp. 169-177.

Yagel, "Volume Viewing Algorithms: Survey", retrieved on Jan. 15, 2010 at <<http://www.cs.duke.edu/courses/spring03/cps296.8/papers/YagelViewingSurvey.pdf>>, In International Spring School on Visualization., pp. 1-22.

\* cited by examiner

SPACE SKIPPING FOR MULTI-DIMENSIONAL IMAGE RENDERING

BACKGROUND

Multi-dimensional images need to be rendered onto two dimensional displays in many situations such as for medical imaging, mechanical engineering, scientific visualization, computer games and other applications. For example, volume rendering algorithms take an input signal defined on a three-dimensional domain and project it onto a two-dimensional image.

Various techniques are known for rendering three dimensional and higher dimensional images onto two dimensional displays. For example ray-casting involves tracing the path of light through pixels in an image plane into a three dimensional volume. The three dimensional volume may have been obtained empirically using measurement equipment such as an MRI scanner or image capture device. However, ray-casting is extremely computationally expensive and time consuming as it involves integrating data at each point along each ray. This has meant that many practical applications that use ray-casting have typically rendered images slowly ahead of time. Also, typically only the surfaces of objects in the volume have been rendered in order to cut down on the amount of computation required. In the case of medical imaging applications this has led to omission of context providing detail in the resulting two dimensional images and this makes it harder for medical staff to understand and interpret the rendered images.

Some techniques for speeding up ray-casting have been proposed such as empty space skipping using depth-first tree searches. These techniques are designed for execution on CPUs.

The embodiments described below are not limited to implementations which solve any or all of the disadvantages of known multi-dimensional image rendering systems using space skipping.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later. Space skipping for multi-dimensional image rendering is described. In an embodiment a ray-casting engine is used to form a two dimensional image from an at least three dimensional image volume by computing rays extending from a camera location, through the two dimensional image and into the volume. For example, a space skipping logic is used to clip the rays such that computationally expensive aspects of ray-casting only need to be performed along the clipped rays. For example a volume pyramid is formed by repeatedly reducing the resolution of the volume data. In an example, each ray is intersected with the lowest resolution volume of the pyramid and clipped using data from that volume. In examples, the clipping is then repeated at higher resolutions in order to clip the ray closely to non-transparent voxels in the volume and optimize the task of rendering the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for image rendering using ray-casting, the system described is provided as an example and not a limitation. As those skilled in the art will appreciate, the present examples are suitable for application in a variety of different types of image rendering systems.

Figure 1:
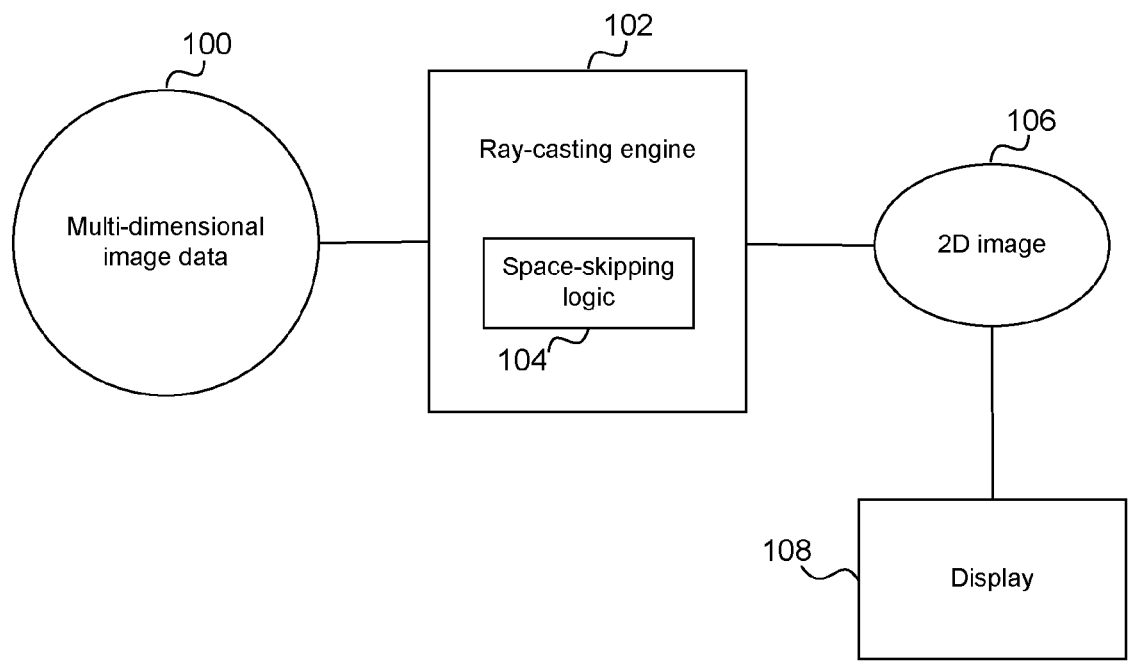
FIG. 1 is a schematic diagram of an image rendering system.

FIG. 1 is a schematic diagram of an image rendering system. Multi-dimensional image data, such as three dimensional volumetric data, 100 is input into a ray-casting engine 102. The ray-casting engine 102 also comprises space skipping logic 104. A computer-implemented ray-casting engine renders a two dimensional image 106 which is then optionally displayed on a display 108 of any suitable type. A non-exhaustive list of examples of multi-dimensional image data is: 3D medical image data, magnetic resonance imaging (MRI) data, computed tomography (CT) data, single photon emission computed tomography (SPECT) data, positron emission tomography (PET) data, DTI tractography data and ultrasound scan data. Other non-medical applications, such as radar or microscopy can also generate multi-dimensional data.

The ray-casting engine 102 is arranged to carry out volume rendering by calculating rays through a specified camera centre (or specified view point) and into a volume specified by the data 100. The term "ray-casting" is used herein to refer to a process for rendering three (or higher) dimensional volumetric data to a two dimensional image by following computed rays of light. For example, the rays may be computed from the eye of a hypothetical observer situated at a specified camera position to a specified light source. In the examples described herein the ray-casting engine 102 is optimized by using empty space skipping logic 104. Empty space skipping logic 104 provides functionality to increase the speed and computational efficiency of rendering, and optionally also for reducing the intensity of memory use at the ray-casting engine 102 by avoiding the need to render portions of the image that are transparent. The output from the ray-casting engine is a rendered two dimensional image 106. The rendered image is then optionally displayed on a display screen. The display screen can be directly connected to the ray-casting engine 102 or alternatively can be situated remotely from the ray-casting engine 102.

Preferably the ray-casting engine 102 is implemented at a Graphics Processing Unit (GPU) but it may also be implemented at a CPU. A GPU is a specialized processor that offloads three dimensional graphics rendering from a microprocessor. Unlike CPUs, GPUs have a parallel "many-core" architecture, suitable for fine-grained parallelism. This offers large performance benefits for graphics rendering as well as other complex algorithms.

Figure 2:
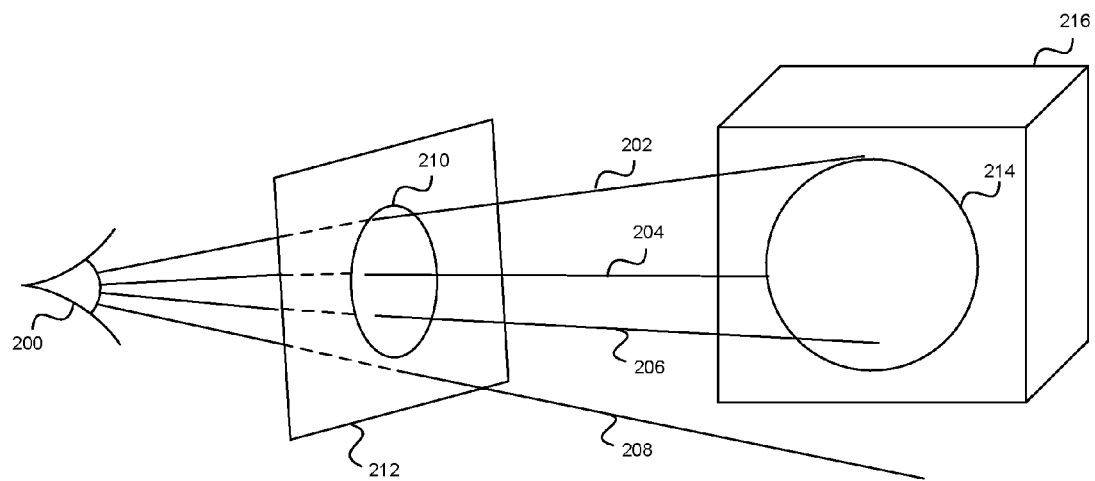
FIG. 2 is a schematic diagram of volume rendering using ray-casting.

FIG. 2 is a schematic diagram of volume rendering using ray-casting. The image is constructed as if a camera were situated at the viewpoint of a hypothetical viewer 200 situated at a location remote from the object being rendered. A number of rays 202, 204, 206, 208 are computed. which can be equal to the number of pixels 210 in a screen 212. The rays have their origin at the situated camera 200. The ray intersects an object 214 in a volume 216.

The ray-casting engine 102 may implement any suitable ray-casting process. An example of volume rendering using ray-casting is now described. For each pixel 210 of the final image, a ray 202, 204, 206, 208 is calculated through the volume. The volume 216 is delineated by being enclosed within a bounding box. In this example the bounding primitive is a box. However, it may be any appropriate geometric shape. Along the part of the ray of sight that lies within the volume, sampling points are selected. The sampling points may be specified by a user on an ad-hoc basis, specified in advance using variables to determine the number of sampling points, generated randomly or selected by any other suitable method. In general the volume 216 is not aligned with the rays and sampling points are usually located between voxels. The values of the sampling points are interpolated from the surrounding voxels. For each sampling point, a gradient is computed. The gradient represents the orientation of local surfaces of an object 214 within the volume. The samples are shaded according to their surface orientation and the source of light in the scene. After all sampling points have been shaded they are composited along the ray of sight, resulting in the final color value for the pixel 210 that is currently being processed. The final color value of the pixel being processed depends on the transparency, opacity, texture and other values of the voxels intersecting the ray.

What is rendered at each pixel 210 of the image is therefore the portion of the object that would be seen in that pixel if the screen were a transparent screen between the object 212 in the three dimensional volume and the situated camera 200.

Figure 3:
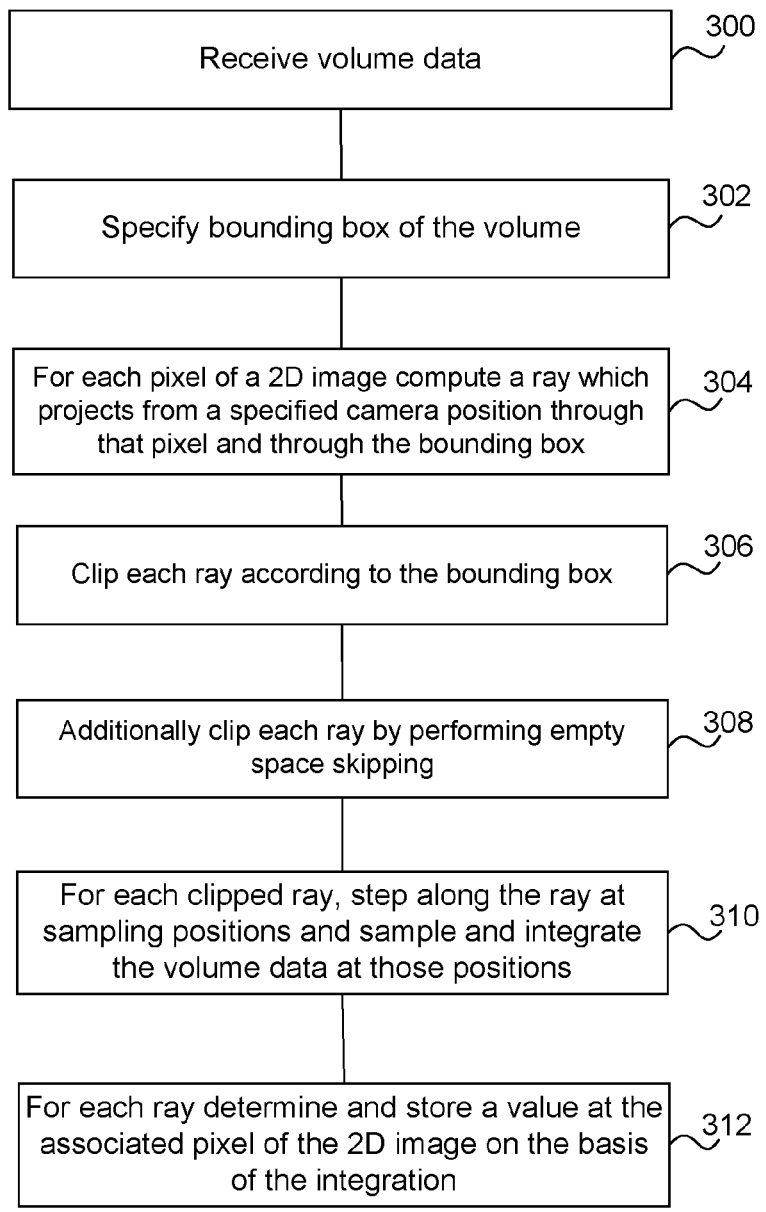
FIG. 3 is a flow diagram of volume rendering using ray-casting.

FIG. 3 is a flow diagram of an example of volume rendering using ray-casting. Volume data is received 300 by the ray-casting engine 102. A bounding box is specified 302. For each pixel of a two dimensional image a ray is computed 304 which projects from a specified camera position through a pixel and through the bounding box. Each ray is clipped according to the bounding box 306. Each ray is then additionally clipped by performing empty space skipping 308. The sampling positions on each ray are stepped along, sampled and the volume data is integrated 310 at those positions. For each ray a value is determined 312 at the associated pixel of the two dimensional image on the basis of the integration.

The volume data received 300 by the ray-casting engine 102 can be any appropriate volume data. For example, sources of volume data include magnetic resonance imaging (MRI) scans, computed tomography (CT) scans, single photon emission computed tomography (SPECT) scans, positron emission tomography (PET) scans, DTI tractography data or ultrasound scans. Examples of non-medical sources of three dimensional volumetric data include volumetric data for mechanical engineering, scientific visualization or computer games, such as radar data, height-temperature maps or microscopy data.

A bounding box is specified 302. In the examples herein the bounding box is a cuboid however, this is not essential, any suitable form of bounding volume may be used. A three dimensional scalar array of dimension (w,h,d) is used to define a local co-ordinate system on the volume data. These discrete values in conjunction with trilinear texturing, are used to define a sampling function $V(x,y,z): ^3 \rightarrow [0,1]$. In alternative examples a different form of texturing could be used such as nearest neighbor interpolation, bilinear texturing or anisotropic texturing. It is desired to render the volume to an image $I(x,y): \Omega \subset ^2 \rightarrow [0,1]^4$. An example of the image rendered is an ARGB (alpha, red, green, blue) image. ARGB images allow partial transparency which is useful for medical images which need to be of diagnostic quality.

A 4-by-4 transformation matrix P is provided which projects from volume co-ordinates to image co-ordinates. The third row of P allows for near and far clipping planes to be specified.

The ray-casting kernel begins by computing a ray $r(\lambda)=a+\lambda \hat{d}$ 304 for each pixel. The ray is computed starting from a specified camera position. The camera may be an affine or perspective camera and may be inside or outside the bounding box. For an image pixel with index (x,y), a=s(0), where $s(z) = \lfloor P^{-1}(x+0.5, y+0.5, z, 1) \rfloor$, $\lfloor . \rfloor$ represents the operation of de-homogenizing a vector by dividing its entries by its last component. Then d=s(1)−a and $\hat{d}=d/|d|$.

Before integration each ray is clipped to all the active clipping planes. These planes include both the bounding box of the volume 306 and any planes specified by the user. Each clipping plane π is a 4-vector such that a point (x,y,z) is visible if $\pi^T(x,y,z,1)>0$. $\lambda_{near}$ and $\lambda_{far}$ are updated by intersecting each ray with each clipping plane.

Empty space skipping is also performed 308. Empty space skipping is a beneficial optimization carried out in volumetric ray-casting because each ray may be sampled hundreds of times in each volume. This is very computationally expensive so it is desirable to avoid wasting resources stepping along empty pixels.

In an example empty space skipping can be carried out by making space trees. In a tree based approach the whole volume is divided up into sub volumes. The sub volumes that are not empty are further subdivided. These subdivisions are used to construct a tree. A ray is passed through the volume and the tree is examined recursively using depth first search. Empty parts of the tree can then be ignored during ray-casting.

Empty space skipping using space trees and depth-first search works well on a CPU. On a GPU each thread has to execute the same instructions at the same time. It is recognized herein that as rays trace different paths on the tree this leads to thread divergence which can lead to poor GPU performance. In addition, each time an empty node is located it is necessary to return to the parent node and trace the opposite side of the tree. This requires stack space to store the location in the tree. The amount of stack space required is proportional to the number of levels in the tree. For a large tree a significant amount of stack space is required. GPUs are not structured to have large amounts of quickly accessible stack space.

In multi-resolution empty space skipping, several volumes at different resolutions are created from the main volume. For example, in the lowest resolution volume each voxel stores both the minimum and maximum density (or opacity) of the corresponding voxels in the main high-resolution volume.

A ray is cast through the volume and each voxel of the low-resolution volume that is intersected by the ray is visited, starting with the voxel nearest the viewer. If there are no visible features contained within the voxel, the start position is pushed back until a non empty voxel is found. Similarly the end position is pushed back each time a non-empty voxel is encountered. The same procedure is then carried out at the next resolution to constrain the empty space skipping further. Ultimately the same procedure is carried out on the volume at the resolution of the data. Multi-resolution empty space skipping is described in more detail herein with reference to FIGS. 4 to 8.

For each clipped ray sampling positions along the ray are defined as $\{r(\lambda_j)\}$ for $\lambda_j=\lambda_{near}+j\cdot\lambda_{step}$ and $j\in\{0,(\lambda_{far}-\lambda_{near})/\lambda_{step}\}$. $\lambda$step may be 1 but can be any real value. The ray is then stepped along 310 at these positions, sampling the texture at each position as $(r(\lambda))$.

Any appropriate method of integration can be used to determine the color value of each pixel. The result of the integration is a color value for each pixel of the two dimensional image determined on the basis of the integration 312. In an example maximum intensity projection (MIP) integration is used. The result of the integration is the maximum of the sampled scalar values along the ray $I(x,y)=\max_j\{V(r(\lambda_j))\}$. Minimum and average values can be similarly computed.

In a further example alpha blending integration is used. Alpha blending is a convex combination of two colors allowing for transparency effects. An associated or pre-multiplied ARGB color vector is updated along each ray as $c=c+(1-c_\alpha)src_j$, where $src_j$ represents the amount of light and opacity emitted or reflected along the viewing direction at position $r(\lambda_j)$. A transfer function is supplied as a set of key-points $\{(x,\alpha,r,g,b)_j\}$, where $\alpha$ represents a level of transparency. Such that $\forall j:x_j,\alpha_j\in[0,1]$ and $r_j,g_j,b_j\leq\alpha_j$ are pre-multiplied colors. A sampling function $T(x):[0,1]\to[0,1]^4$ can then be defined which maps scalar volume values to colors and opacities. In this example $src_j=T(V(r(\lambda_j)))$ but the sampling function may be any appropriate function.

Pre-integration of the transfer function can be used to avoid unnecessary aliasing where the transfer function may contain high frequencies. In this case $src_j=T_{2D}(V(r(\lambda_{j-1})),V(r(\lambda_j)))$, where $T_{2D}: {}^2\to[0,1]^4$ is a pre-computed texture such that $$T_{2D}(x,y) = \begin{cases} \int T(\tau)d\tau/(y-x) & (x\neq y) \\ T(x) & (x=y) \end{cases}.$$

Gradients are estimated during integration using 6-point finite differences in order to perform shading:

$$\nabla V(x,y,z) \approx \frac{1}{2\delta}\begin{bmatrix} V(x+\delta,y,z)-V(x-\delta,y,z) \\ V(x,y+\delta,z)-V(x,y-\delta,z) \\ V(x,y,z+\delta)-V(x,y,z-\delta) \end{bmatrix}.$$

Optionally the ray start position can be jittered by up to one voxel in the direction of the ray in order to mitigate wood grain artifacts. In this case $\lambda_j=\lambda_{near}+(j+J(i,j))\lambda_{step}$ where $J(i,j): {}^2\to[0,1]$ is a pre-computed jitter texture.

Optionally early ray termination can be implemented such that if $c_\alpha$ becomes sufficiently close to 1 during integration the ray computation may be considered finished. This is because the object which is being rendered is sufficiently opaque that nothing that is behind it is visible from the viewpoint of the situated camera.

Figure 4:
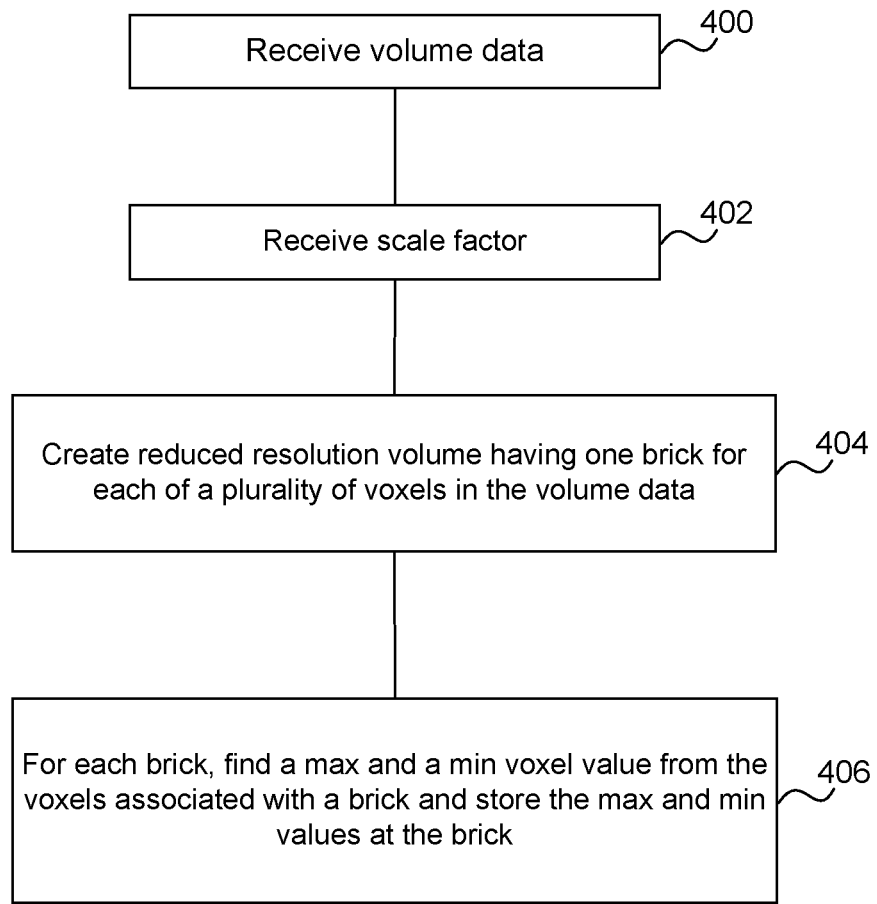
FIG. 4 is a flow diagram of forming a multi-resolution pyramid of bricks.

As described with reference to FIG. 3 above, particularly block 308 empty space skipping is desired in order to optimize the rendering. A multi-resolution method for empty space skipping is now described with reference to FIG. 4-FIG. 8. FIG. 4 is a flow diagram of forming a multi-resolution pyramid of bricks. Volume data is received 400 along with a scale factor 402. A reduced resolution volume is created 404 having one brick for each of an associated plurality of voxels within the volume data. For each brick, one or more values are stored 406 on the basis of the values of the associated voxels in the next highest volume. In an example these values are a maximum and minimum voxel value from the voxels associated with the brick. Other suitable values could be stored such as an average value, a median value or other statistic describing the voxel values.

The reduced resolution volume is created 404 according to the scale factor 402 corresponding to the required reduction in resolution. In an example two proxy volumes can be created with scale factors of 8 and 64. However, any suitable number of proxy volumes can be created with any appropriate scale factor depending on the application domain and the computing resources available. In an example the maximum and minimum values from the voxels associated with the brick are found and stored 406. However, this could be a mean value, a median value or any other appropriate value associated with the voxels.

Figure 5:
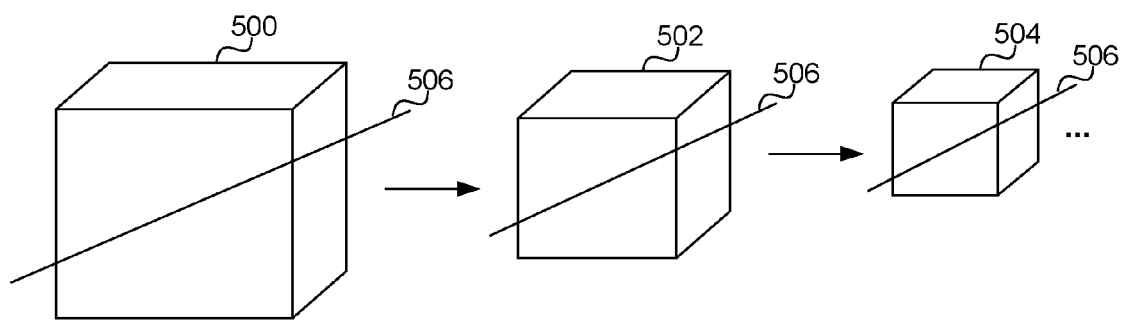
FIG. 5 is a schematic diagram of bricks in a pyramid at different resolutions.

FIG. 5 is a schematic diagram of bricks in a pyramid of low resolution proxy volumes at different resolutions. 500 is a brick in the lowest resolution proxy volume. 502 is a brick in the next lowest resolution proxy volume and 504 is a brick in the original volume data. Each of the volumes is intersected by a ray 506. Each brick in a low resolution proxy volume stores the minimum and maximum values, or any other appropriate value within a corresponding brick of the high resolution volume as described with respect to FIG. 4 above.

Figure 6:
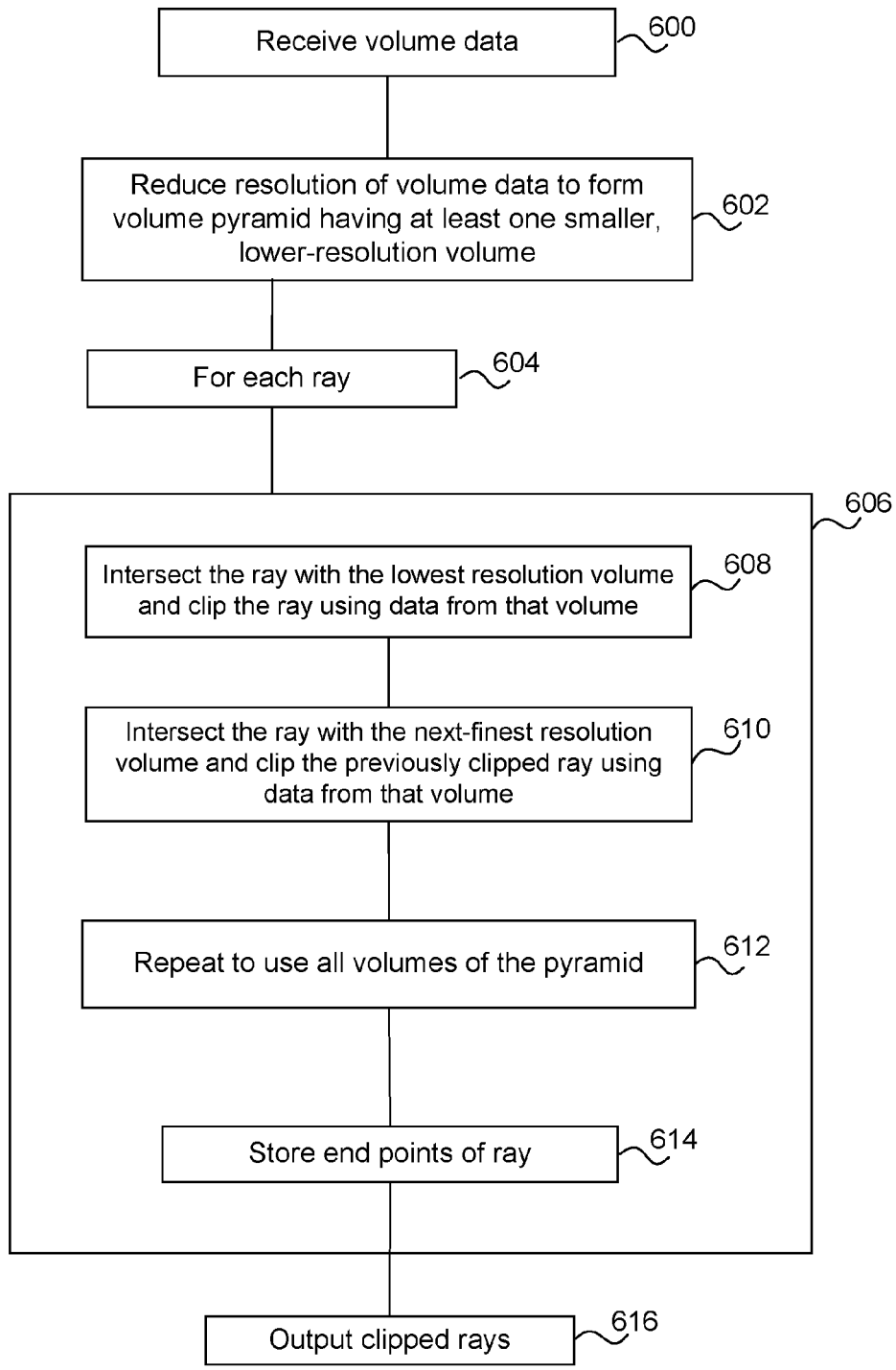
FIG. 6 is a flow diagram of empty space skipping.

FIG. 6 is a flow diagram of an example empty space skipping process. Volume data is received 600. The resolution of the volume data is reduced, as described in FIG. 4 and FIG. 5 above, in order to form 602 a volume pyramid having at least one smaller, lower resolution volume. For each ray 604 an empty space skipping engine 606 is applied which comprises intersecting the ray with the lowest resolution volume and clipping 608 the ray using data from that volume. Intersecting the ray with the next finest resolution volume and clipping 610 the previously clipped ray using data from that volume and repeating 612 the clipping using all the volumes of the pyramid. The end points of the rays are stored 614 and the clipped rays are output 616.

For each ray after it has been clipped to the bounding planes as described at 306 above the ray is intersected with the lowest resolution proxy volume. Each intersected brick in the range [$\lambda_{near}, \lambda_{far}$] is visited by walking through the low resolution bricks from front to back. Any appropriate three dimensional line drawing routine can be used such as a Bresenham-style three dimensional line drawing routine.

For each intersected brick the ray parameters $\lambda_f, \lambda_b$ are computed at the front-most and back-most intersection with the brick. At the first non-transparent brick, $\lambda_{near} := \lambda_f$ and $\lambda_{far} := \lambda_b$. At subsequent non-transparent bricks $\lambda_{far}$ is reset such that $\lambda_{far} := \lambda_b$ for each non-transparent brick encountered. When an opaque brick is encountered the ray may optionally terminate. Determining whether a brick is transparent or opaque is described with reference to FIG. 7 below.

After stepping along the rays through the lowest resolution proxy volume, the values of $\lambda_{near}$ and $\lambda_{far}$ are updated for each ray. Each ray is clipped 608 more tightly to the original volume data than the original bounds. The same process is then repeated 610 at the next finest resolution, beginning each ray at the new $\lambda_{near}$ position. The process has been repeated 612 using all the volumes of the pyramid. In this way the near and far clipping positions for each ray are progressively updated with efficient parallelism.

The examples of empty space skipping described herein can be implemented using a graphics processing unit and using any suitable parallel computing architecture in order to obtain significant improvements in processing speed whilst retaining quality of results. For example each level of ray clipping can be implemented in a separate kernel provided by a parallel computing architecture. For example, the parallel computing architecture may gives access to a native instruction set and memory of suitable parallel computational elements. Used in this manner GPUs effectively become open architectures like CPUs. Although empty space skipping is described herein as being implemented using a parallel computing architecture this is intended as an example and not a limitation. Empty space skipping can be implemented in parallel or in serial on any appropriate GPU or CPU architecture.

The tightest bounds for each ray are used in the integration phase of the ray-casting process which uses the original high resolution volume data. For scalar integration modes such as maximum intensity projection (MIP) there are similar rules for adjusting $\lambda_{near}, \lambda_{far}$ based on whether each brick may contain values that affect the integration result.

Figure 7:
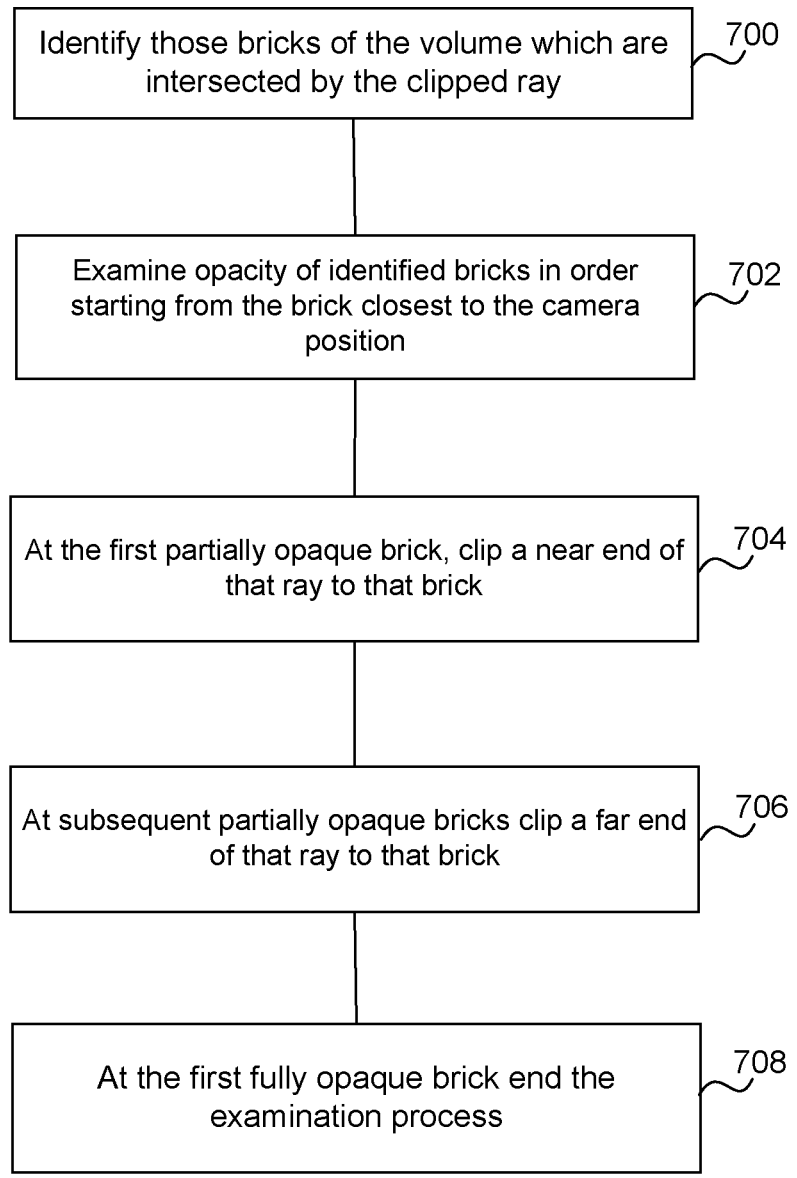
FIG. 7 is a flow diagram of traversing bricks.

The adjustment of $\lambda_{near}, \lambda_{far}$ for each proxy volume additionally comprises traversing the bricks and determining whether a brick is transparent. FIG. 7 is a flow diagram of traversing bricks. The bricks of the volume that are intersected by the clipped ray are identified 700. The opacity of the identified bricks is examined 702 and at the first partially opaque brick the near end of the ray 704 is clipped to that brick. At a subsequent partially opaque brick the far end of the ray 706 is clipped to that brick. At the first full opaque brick the process can be terminated.

With a pre-integrated transfer function it is possible to determine whether a brick is transparent from the minimum and maximum scalar volume values. The pre-integrated transfer function stores the average opacity of the transfer function between each pair of scalar values. Therefore a brick may be considered transparent when the pre-integrated opacity between minimum and maximum values is below a threshold θ, which is close to zero, $T_{2D}(v_{min}, v_{max}) < \theta$. In an example θ=0.002. θ can be specified by the user either in an ad-hoc manner or in advance, determined automatically or by any other appropriate means. If the pre-integrated opacity is above the threshold level then the brick is regarded as partially opaque and the near end of the ray 704 is clipped to that brick. When the opacity falls below the threshold level then the far end of the ray 706 is clipped to the last brick above the threshold level.

A similar computation can be used to discover fully opaque bricks. When a fully opaque brick is encountered then ray may optionally be terminated and the examination process ended 708. The viewer would be unable to see any detail behind the brick so it does not need to be rendered.

Figure 8:
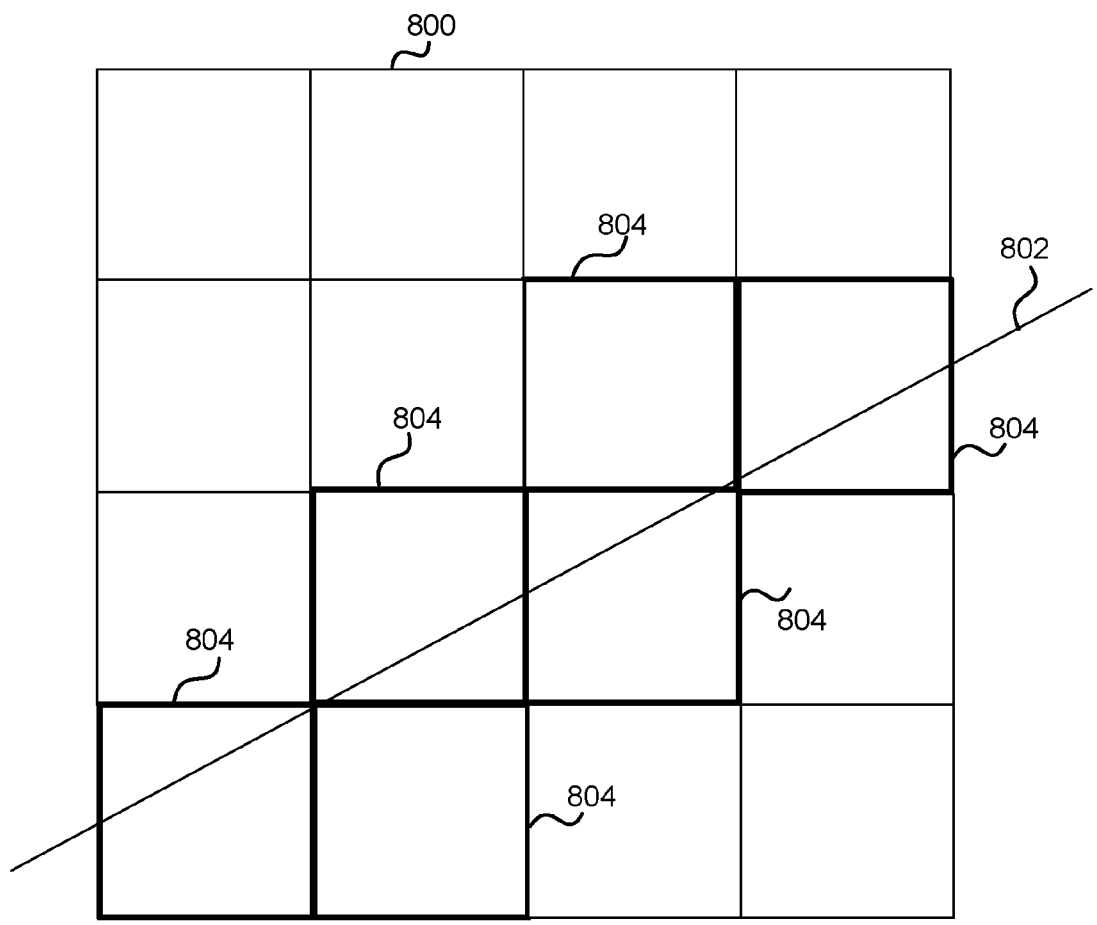
FIG. 8 is a schematic diagram of traversing bricks in two dimensions.

FIG. 8 is a schematic diagram of traversing bricks in two dimensions. The squares 800 represent bricks whose minimum and maximum values are stored in a low resolution proxy volume. All bricks 804 that intersect a ray 802 are traversed determining whether each brick is visible. The ray bounds $\lambda_{near}$ and $\lambda_{far}$ are tightened accordingly. The space skipping algorithm is akin to a breadth-first traversal of a BSP tree as opposed to the depth-first traversal as described with regard to FIG. 3. For example, the volume pyramid is used to carry out a breadth-first search of a tree data structure representation of the volume data.

Figure 9:
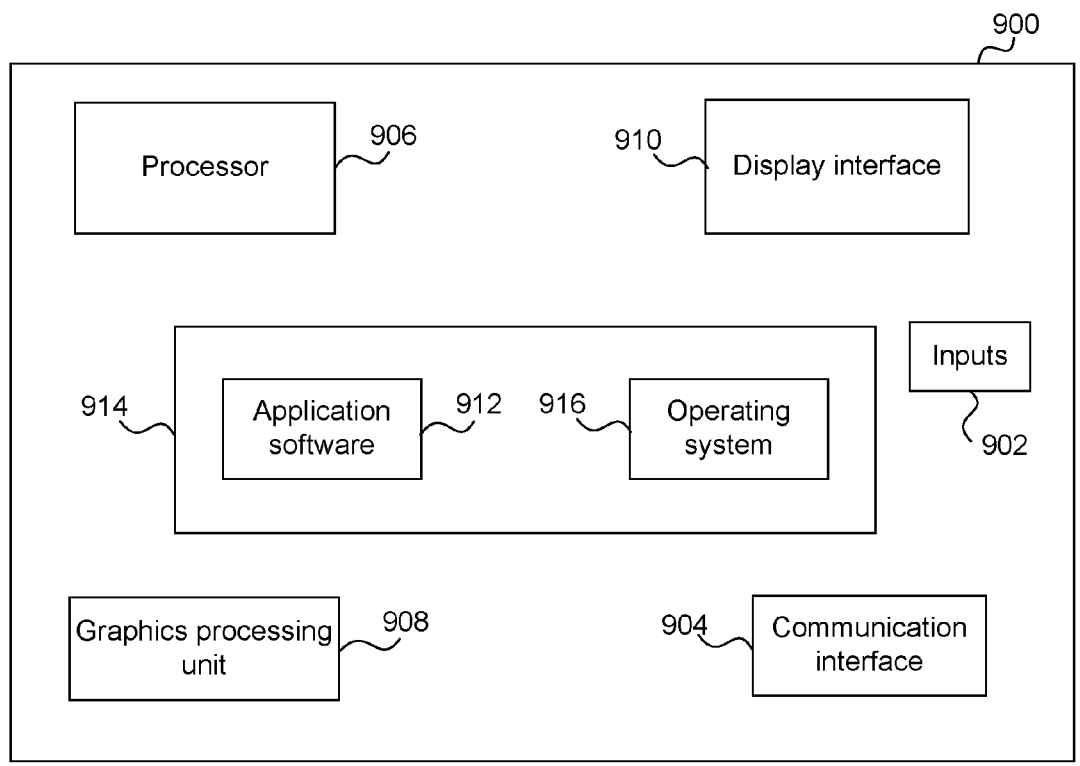
FIG. 9 illustrates an exemplary computing-based device in which embodiments of space skipping for multi-dimensional image rendering may be implemented.

FIG. 9 illustrates various components of an exemplary computing-based device 900 which may be implemented as any form of a computing and/or electronic device, and in which embodiments of multi-dimensional image rendering using empty space skipping may be implemented.

The computing-based device 900 comprises one or more inputs 902 which are of any suitable type for receiving user input, for example images for rendering, media content, Internet Protocol (IP) input. The device also comprises communication interface 904 for communicating with one or more communication networks, such as the internet (e.g. using internet protocol (IP)) or a local network. The communication interface 904 can also be used to communicate with one or more external computing devices, and with databases or storage devices.

Computing-based device 900 also comprises one or more processors 906 which may be microprocessors, controllers or any other suitable type of processors for processing computing executable instructions to control the operation of the device in order to perform image rendering. The device also comprises one or more graphics processing units 908 for graphics rendering. Platform software comprising an operating system 916 or any other suitable platform software may be provided at the computing-based device to enable application software 912 to be executed on the device.

The computer executable instructions may be provided using any computer-readable media, such as memory 914. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 900 it will be appreciated that the storage may be distributed or located remotely and accessed via a network or other communication link (e.g. using communication interface 904).

A display interface 910 is also provided such as an audio and/or video output to a display system integral with or in communication with the computing-based device. The display system may provide a graphical user interface, or other user interface of any suitable type although this is not essential. Any other suitable type of output may also be provided.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of rendering volume data comprising an image having at least three dimensions to form a two-dimensional image comprising:
    using a ray-casting engine to form the two-dimensional image by computing rays extending from a camera location, through the two-dimensional image and into the volume, and carrying out integration along those rays;
    jittering the ray start position by up to one voxel in the direction of the ray in order to mitigate wood grain artifacts;
    arranging a space skipping logic to clip rays computed by the ray-casting engine;
    controlling the ray-casting engine such that integration is only performed along the clipped rays;
    arranging the space skipping logic to reduce the resolution of the volume data to form a volume pyramid having at least one smaller, lower-resolution volume and to use the volume pyramid to clip the rays, the at least one smaller, lower-resolution volume being a proxy volume, each proxy volume storing minimum and maximum opacity values for the next higher volume; and
    further arranging the space skipping logic to terminate a ray when a brick meeting a threshold opacity criterion is encountered.

2. A method as claimed in claim 1 wherein the volume data comprises a medical image.

3. A method as claimed in claim 1 wherein the volume data comprises a medical image selected from any of: an MRI scan, a CT scan, an ultra-sound scan.

4. A method as claimed in claim 1 wherein the volume pyramid is used to carry out a breadth-first search of a tree data structure representation of the volume data.

5. A method as claimed in claim 1 wherein forming the smaller, lower resolution pyramid comprises creating one brick in the lower resolution pyramid for each of a plurality of voxels in the volume data; and storing at least one value at each brick on the basis of the associated voxel values of the volume data.

6. A method as claimed in claim 5 which comprises storing a maximum and a minimum of the associated voxel values at each brick.

7. A method as claimed in claim 1 wherein using the volume pyramid to clip the rays comprises, for each ray, intersecting the ray with the lowest resolution volume of the pyramid and clipping the ray using data from that volume; intersecting the ray with the next-finest resolution volume and clipping the previously clipped ray using data from that volume; repeating to use all the volumes of the pyramid; and storing the end points of the clipped ray.

8. A method as claimed in claim 1 wherein using the volume pyramid to clip the rays comprises, for each ray, identifying those bricks of a volume of the pyramid which are intersected by the ray; and examining the opacity of the identified bricks in order starting from the brick closest to the camera location.

9. A method as claimed in claim 8 which further comprises, at the first partially opaque brick, clipping an end of the ray nearest to the camera location.

10. A method as claimed in claim 9 which further comprises, at subsequent partially opaque bricks clip an end of the ray furthest from the camera location.

11. A method as claimed in claim 8 which further comprises, at the first opaque brick end the examination process.

12. A method as claimed in claim 1 wherein the volume pyramid comprises at least two lower resolution volumes, one of those volumes being of lower resolution than the other.

13. A method as claimed in claim 1 which is carried out on a graphics processing unit.

14. A graphics processing unit comprising:
a ray-casting engine arranged to form a two-dimensional image by computing rays extending from a camera location, through the two-dimensional image and into a three dimensional volume, jittering the ray start position by up to one voxel in the direction of the ray in order to mitigate wood grain artifacts using a pre-computed jitter texture, and carrying out integration along those rays;
a space skipping logic arranged to clip rays computed by the ray-casting engine;
the ray-casting engine being arranged such that integration is only performed along the clipped rays; and
the space skipping logic being arranged to reduce the resolution of the volume data to form a volume pyramid having at least one smaller, lower-resolution volume and to use the volume pyramid to clip the rays and to terminate a ray when a brick satisfying an opacity condition is encountered, the at least one smaller, lower-resolution volume being a proxy volume, each proxy volume storing minimum and maximum opacity values for the next higher volume.

15. A graphics processing unit as claimed in claim 14 having a plurality of kernels and wherein the space skipping logic is arranged to use a separate kernel for clipping the rays at each volume of the volume pyramid.

16. A graphics processing unit as claimed in claim 14 wherein the space skipping logic is arranged to use the volume pyramid to clip the rays by, for each ray, identifying those bricks of a volume of the pyramid which are intersected by the ray; and examining the opacity of the identified bricks in order starting from the brick closest to the camera location.

17. A graphics processing unit as claimed in claim 14 which is arranged to carry out a breadth-first search of a tree data structure representation of the volume data provided by the volume pyramid.

18. One or more tangible device-readable media with device-executable instructions that, when executed by a graphics processing unit, direct the graphics processing unit to perform steps comprising:
carrying out ray-casting to form a two-dimensional image by computing rays extending from a camera location, through the two-dimensional image and into a three dimensional medical volume, and carrying out integration along those rays;
jittering the ray start position by UP to one voxel in the direction of the ray in order to mitigate wood grain artifacts using a pre-computed jitter texture:
clipping the rays;
controlling the ray-casting such that integration is only performed along the clipped rays;
reducing the resolution of the three dimensional medical volume to form a volume pyramid having at least one smaller, lower-resolution volume and using the volume pyramid to clip the rays, the at least one smaller, lower-resolution volume being a proxy volume, each proxy volume storing minimum and maximum opacity values for the next higher volume; and
terminating a ray when a brick satisfying an opacity condition is encountered.

19. One or more tangible device-readable media as claimed in claim 18 wherein using the volume pyramid to clip the rays comprises, for each ray, identifying those bricks of a volume of the pyramid which are intersected by the ray; and examining the opacity of the identified bricks in order starting from the brick closest to the camera location.

20. One or more tangible device-readable media as claimed in claim 18 wherein the instructions provide, at the first partially opaque brick, clipping an end of the ray nearest to the camera location.

* * * * *